US010704235B2

(12) United States Patent
Green

(10) Patent No.: US 10,704,235 B2
(45) Date of Patent: Jul. 7, 2020

(54) SYSTEM AND METHOD FOR HARVESTING RAINWATER

(71) Applicant: Andre Green, Pittsburgh, PA (US)

(72) Inventor: Andre Green, Pittsburgh, PA (US)

(*) Notice: Subject to any disclaimer, the term of this patent is extended or adjusted under 35 U.S.C. 154(b) by 368 days.

(21) Appl. No.: 15/386,381

(22) Filed: Dec. 21, 2016

(65) Prior Publication Data
US 2017/0175366 A1    Jun. 22, 2017

Related U.S. Application Data

(60) Provisional application No. 62/270,138, filed on Dec. 21, 2015.

(51) Int. Cl.
E03B 1/04      (2006.01)
G01F 23/00     (2006.01)
E03B 3/03      (2006.01)

(52) U.S. Cl.
CPC .......... E03B 1/042 (2013.01); E03B 3/03 (2013.01); G01F 23/00 (2013.01); E03B 2001/047 (2013.01); Y02A 20/106 (2018.01); Y02A 20/108 (2018.01)

(58) Field of Classification Search
CPC .......... Y02A 20/108; Y02A 20/106; E03B 2001/047; E03B 3/03; E03B 1/042; B01D 2221/12; G01F 23/00
See application file for complete search history.

(56) References Cited

U.S. PATENT DOCUMENTS

| 2,439,633 | A | * | 4/1948 | Reinhart | B01D 24/12 137/590.5 |
| 2,640,789 | A | * | 6/1953 | Hausner | C23C 18/38 427/247 |
| 4,957,624 | A | * | 9/1990 | Peranio | B01D 35/185 210/129 |
| 5,730,179 | A | * | 3/1998 | Taylor | E03B 3/03 137/357 |
| 7,025,879 | B1 | * | 4/2006 | Ticknor | E03B 3/03 210/232 |
| 7,579,951 | B2 | * | 8/2009 | Hirahara | G06K 17/00 340/539.13 |
| 8,881,756 | B1 | * | 11/2014 | Taborek | E04D 13/08 137/357 |
| 2011/0084070 | A1 | * | 4/2011 | Martheenal | B65D 43/0222 220/200 |

FOREIGN PATENT DOCUMENTS

CN    104963380 A    *    10/2015

OTHER PUBLICATIONS

English Machine Translation of CN 104963380 A downloaded from the EPO website. (Year: 2015).*

* cited by examiner

Primary Examiner — Terry K Cecil
(74) Attorney, Agent, or Firm — Gary P. Topolosky

(57) ABSTRACT

A rainwater collection tank system employs a plurality of barrel/tanks, each having a plurality of strainers with a water pump for raising stored water to one or more faucet dispensers/spouts. Permanent tanks are at least partially submerged. Smaller portable units may be anchored to a campground area with screws and/or pins. Multiple units can be situated adjacent one another beneath a multi-sectional V-shaped funnel system of rain diverters.

14 Claims, 4 Drawing Sheets

SYSTEM AND METHOD FOR HARVESTING RAINWATER

CROSS-REFERENCE TO RELATED APPLICATION

This is a perfection of U.S. Provisional Application No. 62/270,138, filed on Dec. 21, 2015, the disclosure of which is fully incorporated by reference herein.

BACKGROUND OF THE INVENTION

This invention relates to a system and method for harvesting rainwater. It further relates to an in-ground, permanently secured system that has numerous, optional amenities built in.

Rainwater harvesting is the gathering, or accumulating and storing, of rainwater. Traditionally, rainwater harvesting has been practiced in areas where water exists in plenty, and has provided drinking water, domestic water, water for livestock, water for irrigation and a way to increase ground water levels. Top rainwater wells can serve as a garden tool for "catching" and storing rainwater from one's yard for reuse as needed. Such recycled rainwater uses include for watering one's plants, household uses (including car washing, laundry) and possibly for some cooking or other food-related applications.

Numerous rainwater collection systems are known. Representative models include those shown in U.S. Pat. Nos. 5,730,179, 6,941,702 and 7,207,748 to name but a few.

SUMMARY OF THE INVENTION

This invention comprises a partially submerged, anchored underground rainwater tank that has a plurality of strainers with a water pump for raising stored water to one or more faucet dispensers/spouts. Preferred embodiments include an extendible dome and water level indicator with one or more options selected from a clock, radio, dvd player, mirror, garden tool holding hook, lockable glove box hose reel and removable flashlight.

BRIEF DESCRIPTION OF THE DRAWINGS

Further features, objectives and advantages of this invention will be clearer with respect to the detailed description of preferred embodiments made with reference to the accompanying drawings in which.

DESCRIPTION OF PREFERRED EMBODIMENTS

Figure 1:
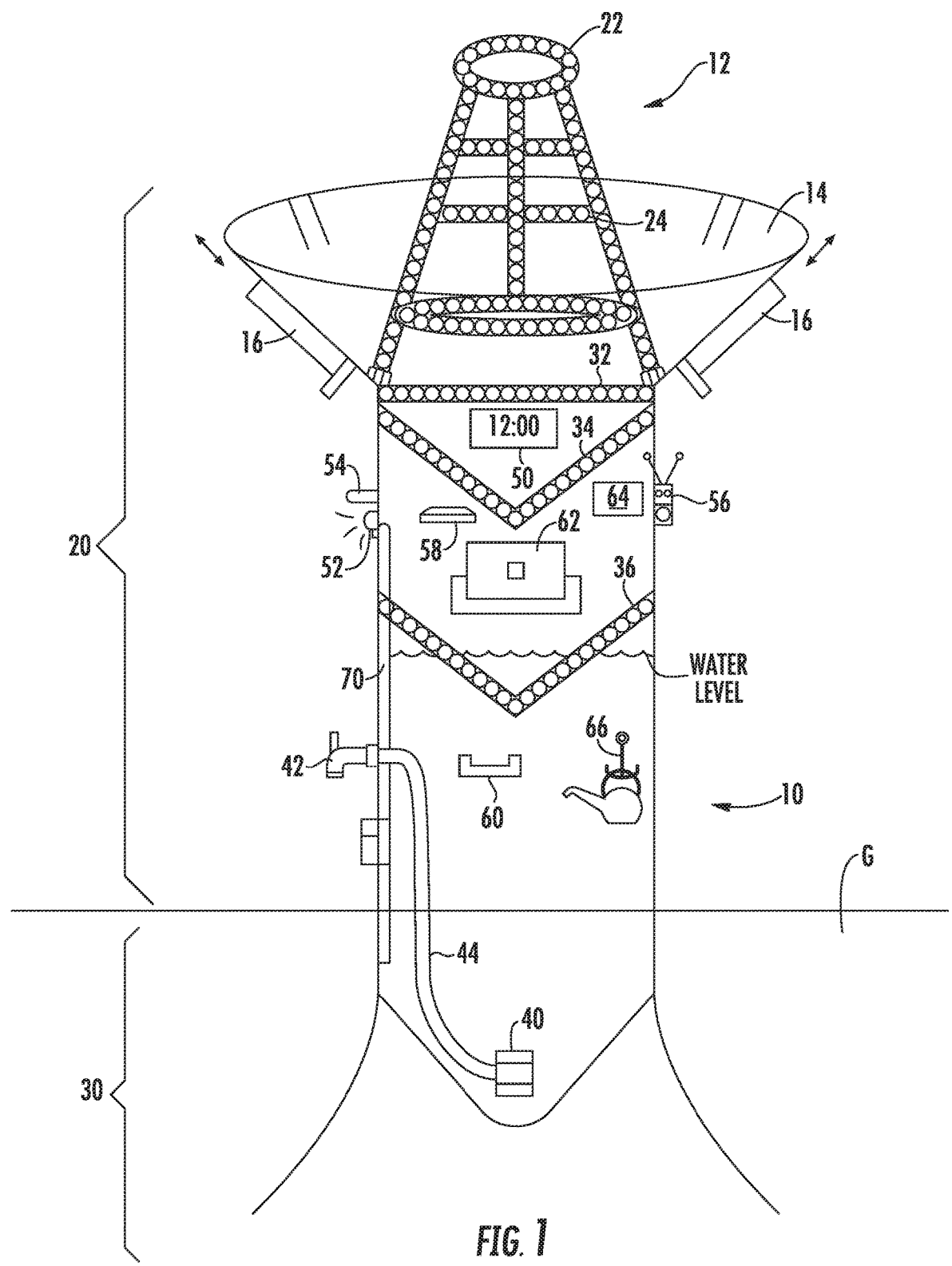
FIG. 1 is a side, partially sectional view of one embodiment of rainwater harvesting system according to present disclosure.

According to preferred embodiments, the present invention comprises a system for rainwater harvesting. The exemplary system shown at FIG. 1 includes a rainwater well 10 firmly secured in the ground G and adapted for collecting/storing rainwater runoff through a strainer cover 12 whether in a single unit or combination of units beneath a rooftop collector. When made and sold as a standalone unit, well device 10 will include a top-surrounding water dome 14 for acting as a further funnel collector. That water dome would have extender arms 16 there beneath.

Figure 2:
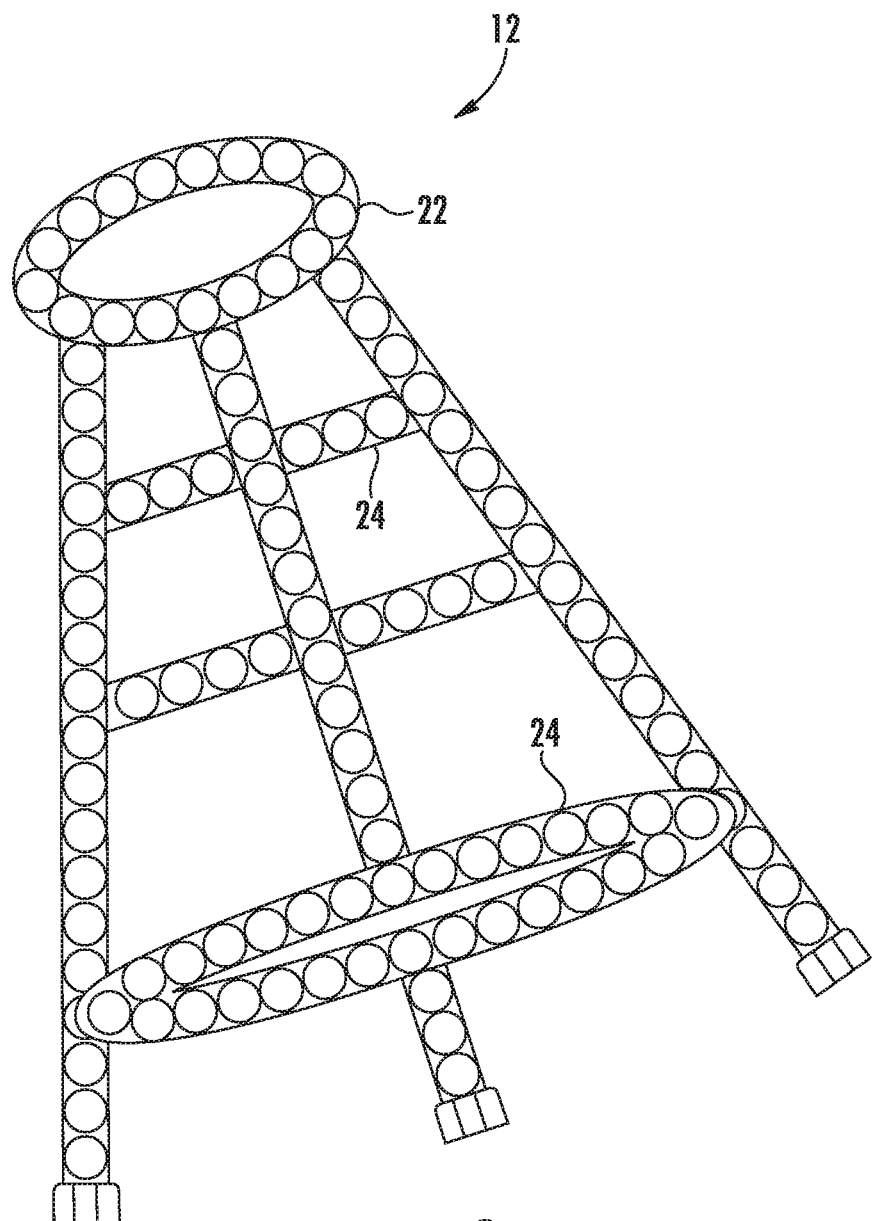
FIG. 2 is a side perspective view focusing on the top strainer cover from FIG. 1.

Atop each model of this invention, there is positioned an improved top water strainer cover 12 (per FIG. 2) comprised of wire hoops 22 and screening 24 for catching yard debris (including leaves and branches) to prevent such debris from clogging the rainwater gathering components of the system proper.

The portion of well 10 that sits above ground G, indicated by element 20, would include a plurality of other water strainers. The first of such strainers 32 would be substantially flat or planar with the lower two 34, 36 (or more) being V-shaped. Ideally, all such strainers should be included as part of a removable drawer or tray for periodic pull out and reverse flushing to remove pollen or the like (not shown).

At the base of this collection "tower", for possible sale under the name FOREVER WATER WELL™, there would be situated an internal holding tank 30 which is preferably isolated from freezing temperatures via insulation and/or a supplemental heating unit. If electric power cannot be run to the tower, the latter heater could be battery and/or solar powered.

Inside the base of this tower, there would be situated a water pump 40, preferably manually operated. If electric service can be run to the tower (see above), it could be electrically run in the alternative. This pump 40 would be purposefully situated below ground level for protecting it from freezing but include conduits (piping) that would extend upwardly to one or more emptying faucet heads 42 through piping or other conduit means 44.

The main tower itself, can be seasonally decorated for a birthday party and/or for the holidays (including Christmas, Thanksgiving, Halloween, July 4th and Easter), as it will be a permanent fixture in one's yard, year-round.

Additional components to the tower may include, a clock 50, flashlight 52 (with light cover 54) which may be permanent or temporarily removable and rechargeable, a radio 56, a CD/dvd player 58 (with small screen), a hose reel/hose holder 60 and sprayer head storage compartment (not shown). Alternately, the tower may include a flashing light for alerting individuals of its physical location in a darkened backyard.

Still further options include a lockable box/compartment 62 for storing gardening gloves, a Hide-a-key area (not shown), mirror 64 and one or more hooks 66 for holding/storing watering cans when not in use.

The side to this tank/tower should include a visual water level indicator 70. It can be made from various metals including steel and/or aluminum, from plastics or from a combination of composite products. The overall shape of this tower can be rectangular (preferably squared), round, oval or in various aesthetic shapes (including a star or heart-shaped tower). Because of their ornamental nature, these devices could be stored, partially underground, in one's front, rear and/or side yards.

Figure 3:
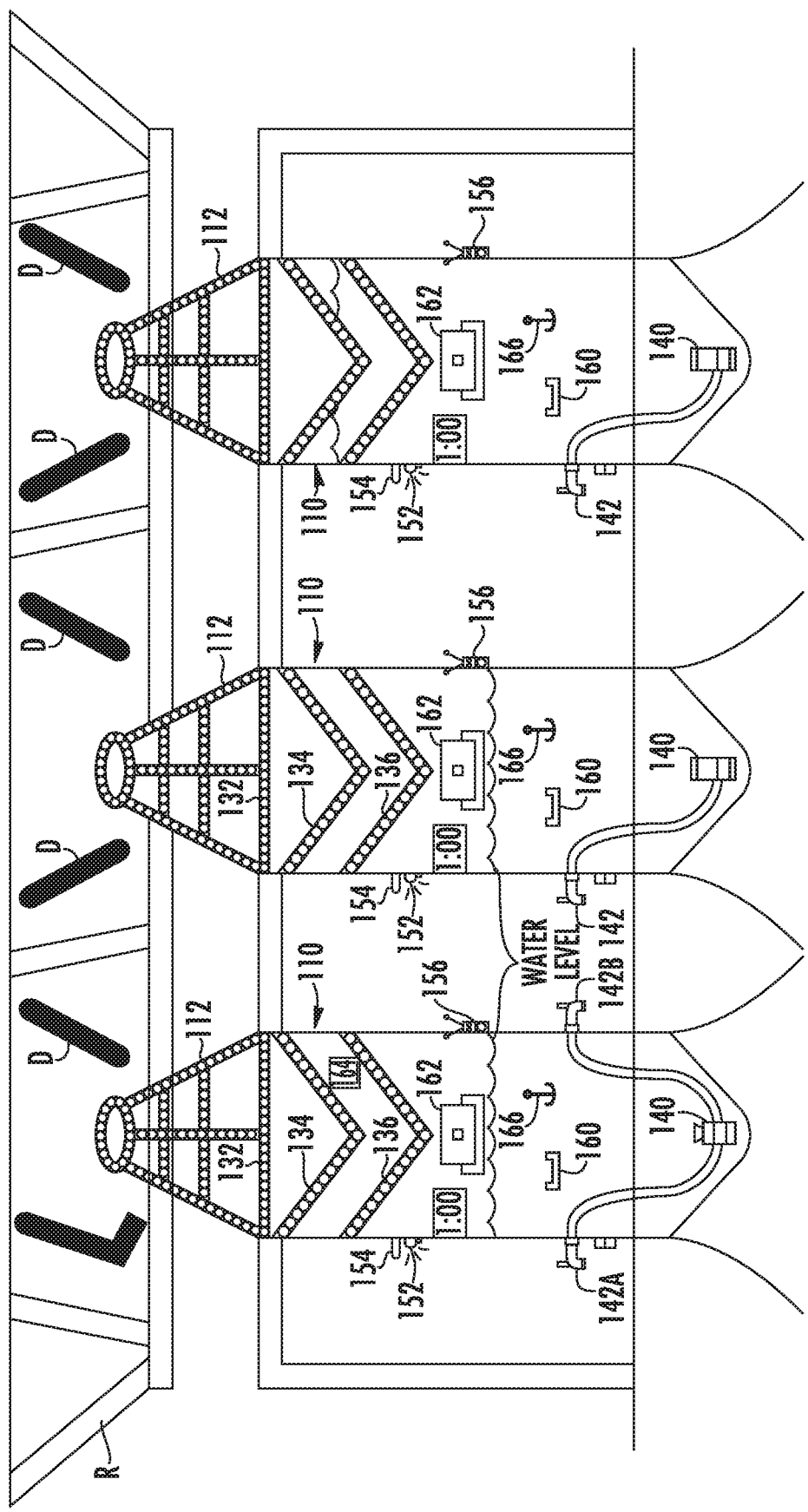
FIG. 3 is a side, partially sectional view showing a first alternative system with three tower units beneath a V-shaped roof collector.

A second model using MULTIPLE towers 110 is shown in accompanying FIG. 3. All other elements in common with the first model (FIG. 1) are commonly numbered, though in the next hundred series. Each of these units, three are shown in series, fits beneath a specially constructed roof funnel system R with a V-shaped top and plurality of water directors D for forcing rainwater into the uppermost entry of the particular tower unit situated directly thereunder.

Figure 4:
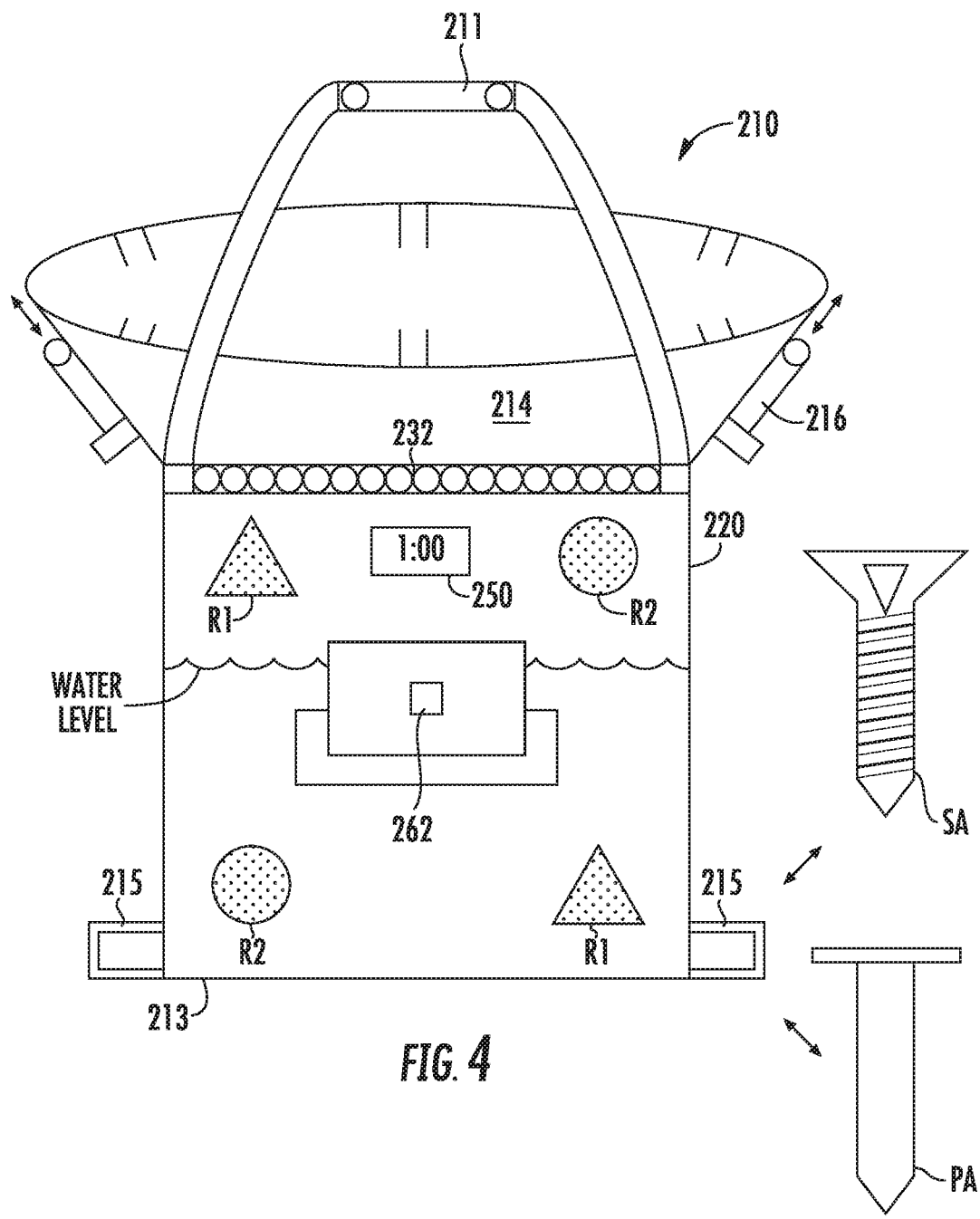
FIG. 4 is a side plan view of a smaller, campground-sized variation.

A third variation, campground model 210, is shown in accompanying FIG. 4. All other elements in common with the first model (FIG. 1) are commonly numbered, though in the second, two hundred series. Specifically, the whole of this third, portable model 210 is above ground, so that its collector tank/well 220 instead includes a top carrying handle 211 so as to serve as a bail or bucket of collected rainwater, suitable for use in campfire extinguishing, or as otherwise needed around camp.

Like its earlier counterparts, this third model 210 still includes a top-surrounding water dome 214 with extender arms 216. But the very base 213 of tank 200 further includes anchor points 215 through which a screw anchor SA, pointed pin anchor PA or both may be used for temporary securement to the ground.

Similar common components include at least one screening layer 232, and preferred side lockbox 262. A new component to this portable variation, however, is a plurality of side reflectors in multiple shapes and sizes: R1 and R2 being representative.

Having described the presently preferred embodiments, it is to be understood that the invention may be otherwise covered by the scope and breadth of the claims that follow.

What is claimed is:

1. A system for harvesting rainwater from other than a building downspout, said system comprising:
   (a) a partially submerged barrel/tank unit that is anchored to the ground in an open yard area, said barrel/tank unit having: (i) an upper rainwater collecting portion with at least one strainer element comprised of a frame of wire hoops and screening for catching yard debris, said strainer element being mostly situated above a funneled dome inlet into said upper rainwater collecting portion; and (ii) having a lower storage portion with a pump for delivering collected rainwater to one or more spouts positioned on a sidewall of the barrel/tank, and
   (b) a water level indicator.

2. The system of claim 1 wherein the barrel/tank unit includes a plurality of intermediate, integral, strainer elements.

3. The system of claim 1 wherein the funneled dome inlet has a plurality of support arms extending there beneath.

4. The system of claim 1 wherein the barrel/tank unit further includes at least one of: an external insulating cover and a heater for preventing collected rainwater from freezing therein.

5. The system of claim 4 wherein the heater for the barrel/tank unit is electronic, solar powered or battery powered.

6. The system of claim 1, which further comprises one or more of: a radio, a CD-dvd player, a mirror and a clock.

7. The system of claim 1, which further comprises one or more of: a hose reel, hose holder and a sprayer storage compartment.

8. The system of claim 1, which further comprises one or more of: a hide-a-key compartment, a lockable gardening gloves compartment and one or more gardening can storage hooks.

9. The system of claim 1 wherein the barrel/tank unit is adapted for decorating for parties and various holidays including Christmas, Thanksgiving, Halloween, Independence Day and Easter.

10. The system of claim 1, which includes multiple barrel/tank units stored in a middle of the yard adjacent one another under a common V-shaped roof with rain diverters into respective barrel/tank units.

11. A method for harvesting free falling rainwater from other than adjacent a building downspout, said method comprising:
   (a) providing a plurality of barrel/tank units that are anchored to the ground, each barrel/tank unit having an upper rainwater collecting portion with at least one removable strainer element comprised of a frame of wire hoops and screening for catching debris, said strainer element being positioned above a funneled dome inlet into said upper rainwater collecting portion, said funneled dome inlet having one or more extendible support arms located there beneath; and having a lower storage portion with a pump for delivering collected rainwater to one or more spouts positioned on a sidewall of the barrel/tank, and a water level indicator; and
   (b) situating the funneled dome inlet of each barrel/tank unit in an open yard area for harvesting free falling rainwater from other than adjacent a building downspout.

12. The method of claim 11 wherein each barrel/tank unit includes a plurality of intermediate, integral wire hoop and screening strainer elements.

13. The method of claim 11 wherein each barrel/tank further includes at least one of: an external insulating cover and a heater for preventing collected rainwater from freezing therein.

14. The method of claim 11 wherein the pump is electronic, solar powered or battery powered.

* * * * *